Figure 1:
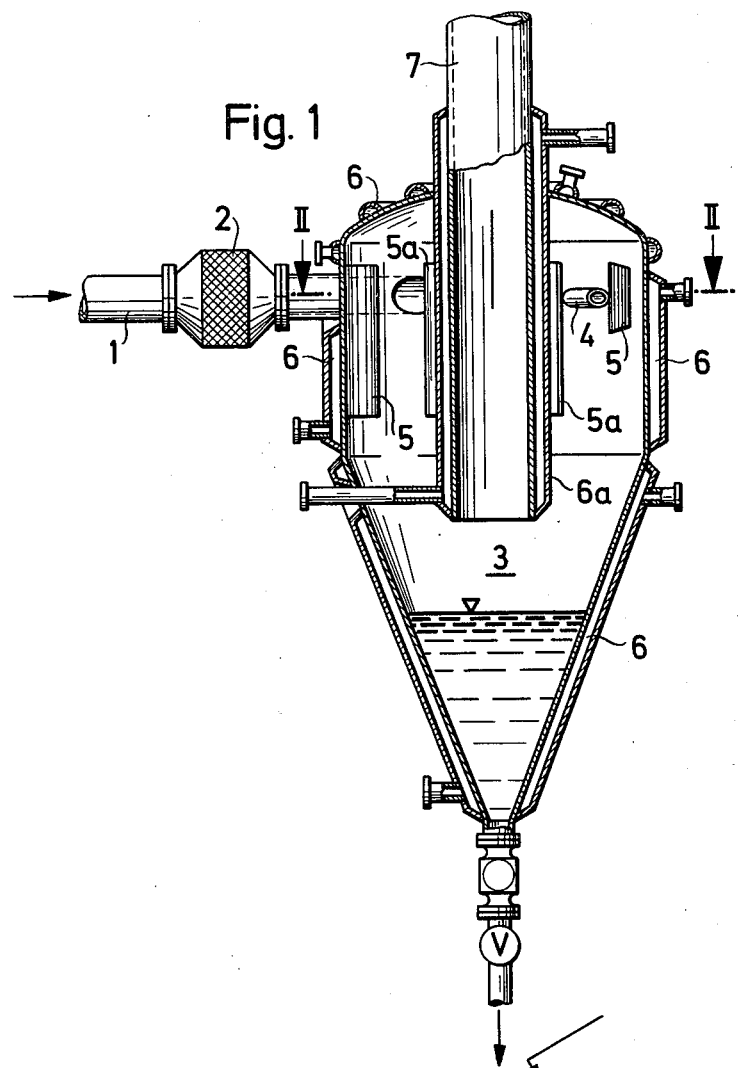

United States Patent [19]
Kiss et al.

[11] 3,922,151
[45] Nov. 25, 1975

[54] PROCESS AND DEVICE FOR SEPARATING CONTAMINATED GAS

[75] Inventors: Ferenc Kiss, Dieburg; Wilhelm Grein; Karl Zellmann, both of Hofheim, Taunus, all of Germany

[73] Assignee: Hoechst Aktiengesellschaft, Frankfurt am Main, Germany

[22] Filed: Apr. 1, 1974

[21] Appl. No.: 456,891

[30] Foreign Application Priority Data
Apr. 3, 1973 Germany.............................. 2316570

[52] U.S. Cl. .................. 55/92; 55/237; 55/269; 55/360; 55/419; 55/459; 62/304
[51] Int. Cl.² ........................................ B01D 47/00
[58] Field of Search ....... 55/92, 222, 235, 238, 264, 55/267–269, 419, 459, 360; 62/304; 261/79 A; 209/211; 210/512

[56] References Cited
UNITED STATES PATENTS

| | | |
|---|---|---|
| 2,452,260 | 10/1948 | Peebles............................ 261/79 A |
| 2,487,176 | 11/1949 | Pitt et al............................... 55/238 |
| 2,991,981 | 7/1961 | Anderson............................. 55/269 |
| 3,470,678 | 10/1969 | Clark et al............................ 55/269 |

Primary Examiner—Bernard Nozick
Attorney, Agent, or Firm—Curtis, Morris & Safford

[57] ABSTRACT

Contaminated gas from containers and installations containing substances polluting the surroundings, is purified by passing the gas, over a conventional safety device against detonation, tangentially into a chamber made of a material resisting pressure shocks, electrically connected with the entire system and grounded, intimately mixing the gas in said chamber with chemically inert gases tangentially introduced into the chamber in the liquid state, condensing the polluting substances by evaporation of the inert gases, freezing them out and transforming them into a flowable state.

5 Claims, 2 Drawing Figures

PROCESS AND DEVICE FOR SEPARATING CONTAMINATED GAS

This invention relates to a process and a device for purifying contaminated gas from containers and devices containing substances polluting the surroundings.

Appropriate purification installations for toxic, combustible and stinking substances have been used for a long time in industry and trade where such substances are produced, stored, decanted or processed. The processes used are the condensation, the absorption by selective or chemically reacting solvents, the adsorption on solids having a large specific surface, and the combustion.

The purification of used or contaminated gas by condensation in heat exchangers can only be used in special cases. In order to achieve a satisfactory purification low temperatures have to be used. At these temperatures a great number of the substances to be eliminated deposit in solid form on the cooled surfaces of the heat exchanger, they impede the heat transmission and obstruct the gas passages. To ensure continuous operation at least two condensers are required, one of which is in operation while the other one is defrosted and cleaned. With a direct contact of the exhaust gas to be purified and the cooling agent the same difficulties arise by the separation of solid matter as in the condensation in heat exchangers. Moreover, cooling agent and condensate mix with each other which necessitates expensive processing steps.

In the case of an absorption by selective solvents or by chemical reaction the harmful substances or the reaction products thereof are always obtained in admixture with the solvent used. These mixtures have to be worked up in appropriate devices the installation and operation of which is quite expensive. When an absorption process is chosen, essential parts of the installation must be installed twice to ensure continuous operation. The number of possible absorbing agents is very limited since, depending on the operating temperature of the installation, an amount of absorbing agent corresponding to the respective vapor pressure remains in the exhaust gas after washing out of the noxious substances.

The adsorption process likewise requires two alternately operated adsorbers and corresponding expenditure for their regeneration because of the limited adsorption capacity of the agents.

The elimination of polluting substances by combustion in an open flame is practicable at the most in large scale plants because of the necessary safety measures and regulations which are especially severe for such installations, whereas a catalytic combustion is suitable for a limited number of harmful substances only, apart from the expenditure pertaining to apparatus and the existing safety rules.

It has now been found that contaminated exhaust gas from containers and installations can be purified by condensation and freezing out the polluting substances without danger in simple manner also practicable in small factories.

The present invention provides a process for purifying contaminated exhaust gas from containers and installations, which comprises passing the said gases via a safety device against detonation tangentially into a chamber which is resistant to pressure shocks, electrically connected with the entire system and earthed, intimately mixing the exhaust gas in the said chamber with chemically inert gases tangentially introduced in the liquid state by means of nozzles, condensing the polluting substances, freezing them out and transforming them into a flowable state by evaporation of the said inert gases.

The present invention also provides a device for purifying contaminated exhaust gas from containers and installations comprising a chamber resistant to pressure shocks and provided with gas inlet tangentially discharging into the chamber and being provided with a safety device against detonation, nozzles for chemically inert gases tangentially discharging into said chamber, baffle plates and gas outlet projecting into the chamber and having guide plates on its outer surface.

Figure 2:
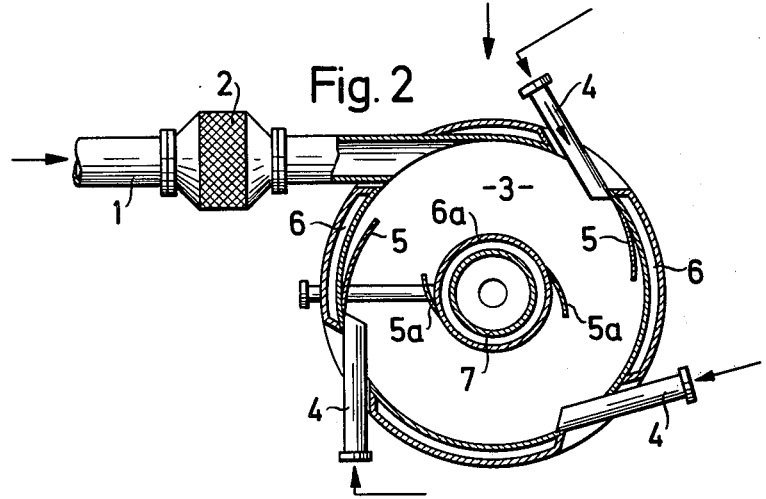

The device suitable for carrying out the process of the invention will now be described in further detail with reference to the accompanying drawing in which FIG. 1 represents a side view and FIG. 2 is a sectional view along line II — II of FIG. 1.

The gas, for example air, contaminated with polluting substances is introduced through conduit 1 via a conventional safety device 2 tangentially into chamber 3 made of a material which is resistant to pressure shocks. The cooling agent, for example liquefied nitrogen, is introduced into chamber 3 also tangentially through several nozzles 4 distributed on the circumference of chamber 3. Baffle plates 5 having a suitable shape and made of an electrically conducting material connected with the conductive walls of chamber 3 bring about, together with the tangential flow of the air and the cooling agent, an especially intense mixing of the said two components. By the shape of the baffle plates 5 the rotating flow is directed away from the chamber walls to the center of the pressure resistant chamber. The intense whirling up of the gas currents and the continuous contact with the electrically conductive baffle plates constantly derive possible static charges.

The walls of chamber 3 are provided with heating means 6 of known type, for liquefying the condensed polluting agents so that they can be drawn off in the liquid state and the apparatus is prevented from freezing which could happen with very moist air by the formation of ice or, for example, with benzene as the frozen product. The air freed from the polluting substances, the degree of elimination depending on the temperature prevailing in the pressure resistant chamber, leaves the chamber through the central conduit 7 which also resists pressure shocks and is provided with heating means 6a and baffle plates 5a.

What is claimed is:

1. A process for purifying contaminated gas, containing a contaminating gas vapor, from containers and installations containing substances polluting the surroundings, which process comprises passing the contaminated gas tangentially into a chamber made of a conductive material resistant to pressure shocks, grounding said chamber, tantentially introducing a chemically inert gas into the chamber in the liquid state at a lower temperature than said contaminated gas and at a position separate from the tangential introduction of said contaminated gas into the chamber, said inert gas being selected in accordance with the contaminating gas to be removed, to cause condensation and freezing of the contaminating gas upon vaporization of the inert gas, intimately mixing the contaminated gas in said chamber with said chemically inert gas, condensing and freezing the contaminating gas vapor in the contaminated gas by evaporation of the chemically inert gas in the chamber to produce a solid to separate said contaminating gas vapor from the clean gas in the contaminated gas, and then transforming the frozen contaminating solid into a flowable material state and separating the flowable contaminating gas material from the cleaned gas and the inert gas by separately removing said flowable contaminating gas material and said clean and inert gases.

2. A device for carrying out the process of claim 1, comprising a generally cylindrical housing defining a hollow chamber, said housing being made of an electrically conductive material resistant to pressure shocks and having a gas inlet formed therein for tangentially introducing said contaminated gas into the chamber at least one spray nozzle for tangentially introducing the chemically inert liquid gas into the chamber at a lower temperature than said contaminated gas and at a location spaced from said gas inlet, a plurality of baffle plates mounted on and distributed along said housing within the chamber on the circumference thereof for mixing the contaminated gas with the inert gas in the chamber thereby to induce condensation and freezing of the contaminating gas vapor to form a solid from the clean gas; means on said housing for transforming the frozen contaminated solid into a flowable material state; said chamber including separate outlet openings formed therein to allow separate removal of the condensed flowable material and the cleaned and inlet gases.

3. The device as defined in claim 2 wherein one of said outlet openings comprises gas outlet means centrally located within said housing and projecting therefrom for discharging cleaned gas from the center of said chamber.

4. The device as defined in claim 4 including a plurality of baffle plates mounted on said gas outlet means, within said chamber, for aiding in the mixing of said contaminated and inert gases.

5. The device as defined in claim 4 wherein said means for transforming the frozen contaminating gas vapors includes means for heating the periphery of said chamber and said gas outlet means to heat frozen polluted substances which accumulate thereon.

* * * * *